(12) United States Patent
Fleckenstein et al.

(10) Patent No.: US 11,162,425 B2
(45) Date of Patent: Nov. 2, 2021

(54) ASSEMBLY FIXTURE

(71) Applicant: Rolls-Royce Corporation, Indianapolis, IN (US)

(72) Inventors: Mark Fleckenstein, Indianapolis, IN (US); Jonathan Rivers, Indianapolis, IN (US); Robert Heeter, Noblesville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 176 days.

(21) Appl. No.: 16/437,966

(22) Filed: Jun. 11, 2019

(65) Prior Publication Data

US 2020/0392872 A1 Dec. 17, 2020

(51) Int. Cl.
*F01D 25/28* (2006.01)
*F02C 7/20* (2006.01)
*F01D 25/24* (2006.01)

(52) U.S. Cl.
CPC ............... *F02C 7/20* (2013.01); *F01D 25/24* (2013.01); *F01D 25/28* (2013.01)

(58) Field of Classification Search
CPC .... F02C 7/045; F02C 7/20; F02K 3/06; F01D 25/24; F01D 25/243; F01D 25/26; F01D 25/28
See application file for complete search history.

(56) References Cited

U.S. PATENT DOCUMENTS

| | | | |
|---|---|---|---|
| 4,490,092 A * | 12/1984 | Premont | F01D 21/045 415/1 |
| 5,267,828 A * | 12/1993 | Lenhart | F01D 25/246 415/9 |
| 5,380,978 A | 1/1995 | Pryor | |
| 6,170,345 B1 | 1/2001 | Kerner | |
| 6,360,421 B1 | 3/2002 | Oatridge et al. | |
| 6,808,143 B2 | 10/2004 | Munk et al. | |
| 6,877,723 B2 | 4/2005 | Martinsson et al. | |
| 6,952,887 B2 | 10/2005 | Muchnik | |
| 9,114,882 B2 | 8/2015 | Robertson, Jr. et al. | |
| 9,719,426 B2 | 8/2017 | Taylor | |
| 9,828,876 B2 * | 11/2017 | Kappes | F01D 25/04 |
| 2013/0195605 A1 * | 8/2013 | Robertson | F01D 11/18 415/1 |
| 2013/0336773 A1 * | 12/2013 | Robertson | F01D 25/24 415/200 |
| 2014/0255152 A1 * | 9/2014 | Totten | F01D 21/045 415/9 |
| 2014/0367921 A1 * | 12/2014 | Konigs | B32B 37/18 277/345 |
| 2015/0003960 A1 * | 1/2015 | Totten | F01D 21/045 415/9 |

(Continued)

*Primary Examiner* — William H Rodriguez
(74) *Attorney, Agent, or Firm* — Crowell & Moring LLP

(57) ABSTRACT

An assembly fixture for a fan casing of a gas turbine engine wherein the fan casing includes a casing having a flange with a plurality of apertures extending therethrough, comprises a locating structure having a positioning feature that is engageable by a fastener extending through a particular aperture of the plurality of apertures to secure the locating structure to the fan casing. The locating structure further includes a locating feature indicating a particular location of the fan casing when the locating structure is mounted to the fan casing.

17 Claims, 9 Drawing Sheets

(56) References Cited

U.S. PATENT DOCUMENTS

| | | | |
|---|---|---|---|
| 2015/0060403 A1* | 3/2015 | Carter | B22F 3/22 216/53 |
| 2015/0159508 A1* | 6/2015 | Robertson, Jr. | F01D 25/32 415/200 |
| 2015/0240662 A1* | 8/2015 | Niggemeier | F01D 25/24 415/207 |
| 2015/0276223 A1* | 10/2015 | Benson | F02C 7/045 60/752 |
| 2015/0292407 A1* | 10/2015 | Riou | F01D 25/04 415/119 |
| 2015/0345320 A1* | 12/2015 | Webb | F01D 25/005 415/196 |
| 2015/0354408 A1* | 12/2015 | Snyder | F01D 25/24 415/196 |
| 2016/0010503 A1* | 1/2016 | Robertson, Jr. | F01D 25/28 415/182.1 |
| 2016/0069214 A1* | 3/2016 | Engebretsen | F01D 21/045 415/196 |
| 2016/0076395 A1* | 3/2016 | Clarkson | B29C 53/56 156/214 |
| 2016/0123171 A1* | 5/2016 | Westphal | F01D 25/243 415/173.1 |
| 2016/0123184 A1* | 5/2016 | Clarkson | F01D 25/02 415/197 |
| 2016/0146050 A1* | 5/2016 | Molnar | F01D 25/24 415/213.1 |
| 2016/0177786 A1* | 6/2016 | Sippel | F01D 11/08 416/189 |
| 2016/0363004 A1* | 12/2016 | Chow | F01D 25/24 |
| 2017/0082118 A1* | 3/2017 | Tanaka | F02K 1/70 |
| 2017/0198642 A1* | 7/2017 | Treat | F02C 7/32 |
| 2017/0211420 A1* | 7/2017 | Pommier | F01D 25/24 |
| 2017/0335862 A1* | 11/2017 | Heeter | F04D 29/526 |
| 2017/0342906 A1* | 11/2017 | Jordan | F01D 25/243 |
| 2017/0370248 A1* | 12/2017 | Kwiatkowski | F01D 25/265 |
| 2018/0034350 A1* | 2/2018 | Shinde | F02C 9/00 |
| 2018/0038241 A1* | 2/2018 | Betancourt | F01D 9/041 |
| 2018/0066675 A1* | 3/2018 | Kappes | F02K 3/06 |
| 2018/0169972 A1* | 6/2018 | Mathon | B29C 53/20 |
| 2018/0230855 A1* | 8/2018 | Heeter | B29C 70/00 |
| 2018/0258954 A1* | 9/2018 | Heeter | F02K 3/06 |
| 2019/0211705 A1* | 7/2019 | Kling | B32B 3/08 |
| 2020/0123924 A1* | 4/2020 | Finlayson | B64C 27/007 |
| 2020/0141265 A1* | 5/2020 | Karapurath | F01D 25/24 |

* cited by examiner

ASSEMBLY FIXTURE

FIELD OF DISCLOSURE

The present subject matter relates generally to fixtures, and more particularly to a fixture for assisting in assembly of a fan casing of a gas turbine engine.

BACKGROUND

A fan casing for a gas turbine engine (GTE) generally requires between 40-100 components to be bonded on the exterior of the fan case for use in mounting external hardware. An example of the components that may be secured to the fan casing are referred to as Click Bonds, manufactured and sold by Click Bond, Inc. of Carson City, Nev. The positions of the components on the fan case often results in complication for assembly, build, and overhaul teams. Component positional tolerance is typically as much as 20% of the base dimensions of the component. If the assembly process can be improved and positional tolerances better controlled, one can realize improvements, such as design flexibility, and thus, potential for weight decrease, time savings, and lower cost.

The assembly teams of some prior engines used dot peens or shallow flat bottom holes or other deformation markings for positioning, but this is not ideal as the deformations can reduce the fan case's strength under ultimate loading.

Another assembly process accomplishes placement through a system of stamping pistons and a rotating table. The fan case is placed on the table and as the table rotates, each piston extends to place the fasteners on the fan case at selected locations. Such an assembly process is, however, complicated, requires large lead times, and is costly to implement.

U.S. Pat. No. 6,170,345 discloses a device for positioning a measuring sensor using a coaxial arrangement.

The background section of U.S. Pat. No. 6,808,143 describes assembly tooling referred to as "templates" that fasten structural parts together temporarily to locate parts relative to one another while assembling airplane wing structures. The assembly tooling is designed using many steps between the original design of the product and the final manufacture of the tool, thereby leading to tools that produce mis-sized wings or wing components outside of the dimensional tolerances of the wing design. Refer to the '143 patent at column 1, lines 23-30. The '143 patent also discloses a method at column 3, lines 22-27 that uses intrinsic features of the wings to allow the wings to self-locate and determine assembly dimensions and contours. The method utilizes a data file, or digital product definition, that resides on a master computer.

U.S. Pat. No. 5,380,978 discloses a computerized, optically guided system for component placement in a "body-in-white" manufacture of a car body.

U.S. Pat. No. 6,952,887 discloses placement tools used with supporting components on a frame where the frame is pressed against a wall to mark the location of fixture tools on which to hang the frame.

U.S. Pat. No. 9,144,882, discloses a fan containment case that uses a mount ring to support a portion of a gas turbine engine core. The location of the engine core is determined using openings and features of the mounting ring.

SUMMARY

According to one aspect, an assembly fixture for a fan casing of a gas turbine engine wherein the fan casing includes a flange having a plurality of apertures extending therethrough, comprises a locating structure having a positioning feature that is engageable by a fastener extending through a particular aperture of the plurality of apertures to secure the locating structure to the fan casing. The locating structure further includes a locating feature indicating a particular location of the fan casing when the locating structure is mounted to the fan casing.

According to a further aspect, an assembly fixture for a fan casing of a gas turbine engine wherein the fan casing includes a first flange having a plurality of apertures extending therethrough and a second flange spaced from the first flange, includes a plurality of locating structures each having a positioning feature that is engageable by a fastener extending through a particular aperture of the plurality of apertures to secure the locating structure to the fan casing and a locating feature indicating a particular location of the fan casing when the locating structure is mounted to the fan casing. A further locating structure is engageable by a further fastener to the second flange and has a further locating feature indicating a further particular location of the fan casing when the further locating structure is mounted to the fan casing.

According to yet another aspect, an assembly fixture for a fan casing of a gas turbine engine wherein the fan casing includes a first flange disposed at an end of the fan casing and having a first plurality of apertures extending therethrough and a second flange disposed at a medial portion of the fan casing spaced from the first flange and having a second plurality of apertures, comprises a plurality of locating structures. Each locating structure has a positioning feature having an enlarged portion engageable by a fastener extending through a particular aperture of the first plurality of apertures to secure the locating structure to the fan casing. Each locating structure further has a plurality of openings each indicating a particular location of the fan casing when the locating structure is mounted to the fan casing. A further locating structure has a further positioning feature having a further enlarged portion engageable by a further fastener extending through a certain aperture of the second plurality of apertures to secure the further locating structure to the fan casing, the further locating structure having a further plurality of openings each indicating a further particular location of the fan casing when the further locating structure is mounted to the fan casing.

Other aspects and advantages will become apparent upon consideration of the following detailed description and the attached drawings wherein like numerals designate like structures throughout the specification.

DETAILED DESCRIPTION

Figure 1:
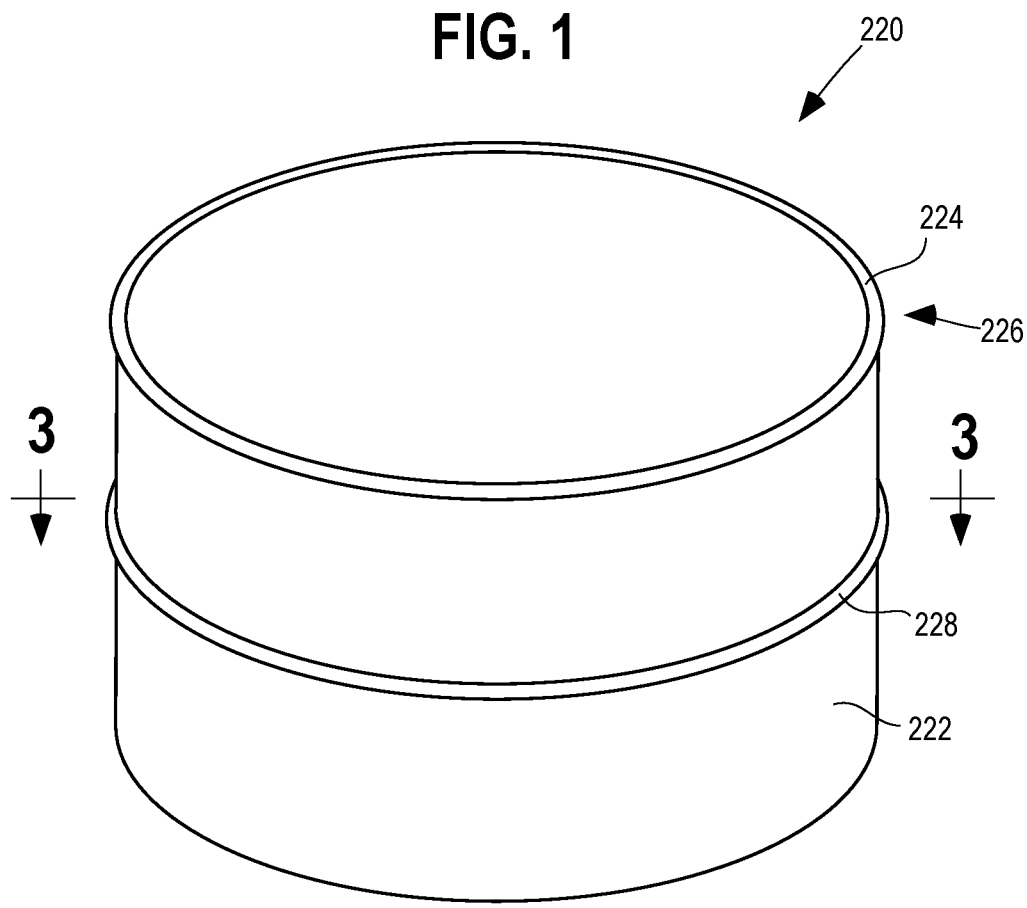
FIG. 1 is an isometric view of a fan casing of a gas turbine engine.

Referring first to the illustrated embodiment of FIG. 1, a fan casing 220 for a GTE (not shown) comprises a casing wall 222. The wall 222 includes a first flange 224 at a first axial end 226 and, optionally, a second flange 228 at a medial axial location spaced from the first axial end 226. In the illustrated embodiment, the fan casing 220 surrounds a fan (not shown) of the GTE. In practice, the wall 222 includes a circular cylindrical portion at one end and one or more non-cylindrical portion(s), such as frustoconical portion(s), angled ramp portion(s), conical portion(s), etc. depending upon the engine type, and engine component that is enclosed thereby.

In the illustrated embodiment, the first flange 224 extends continuously and fully about the circumference of the fan casing, although this need not necessarily be the case. Also, the flange 224 preferably has a constant radial extent about the circumference of the fan casing, although the flange could alternatively have a variable radial extent with circumferential distance.

Figure 2:
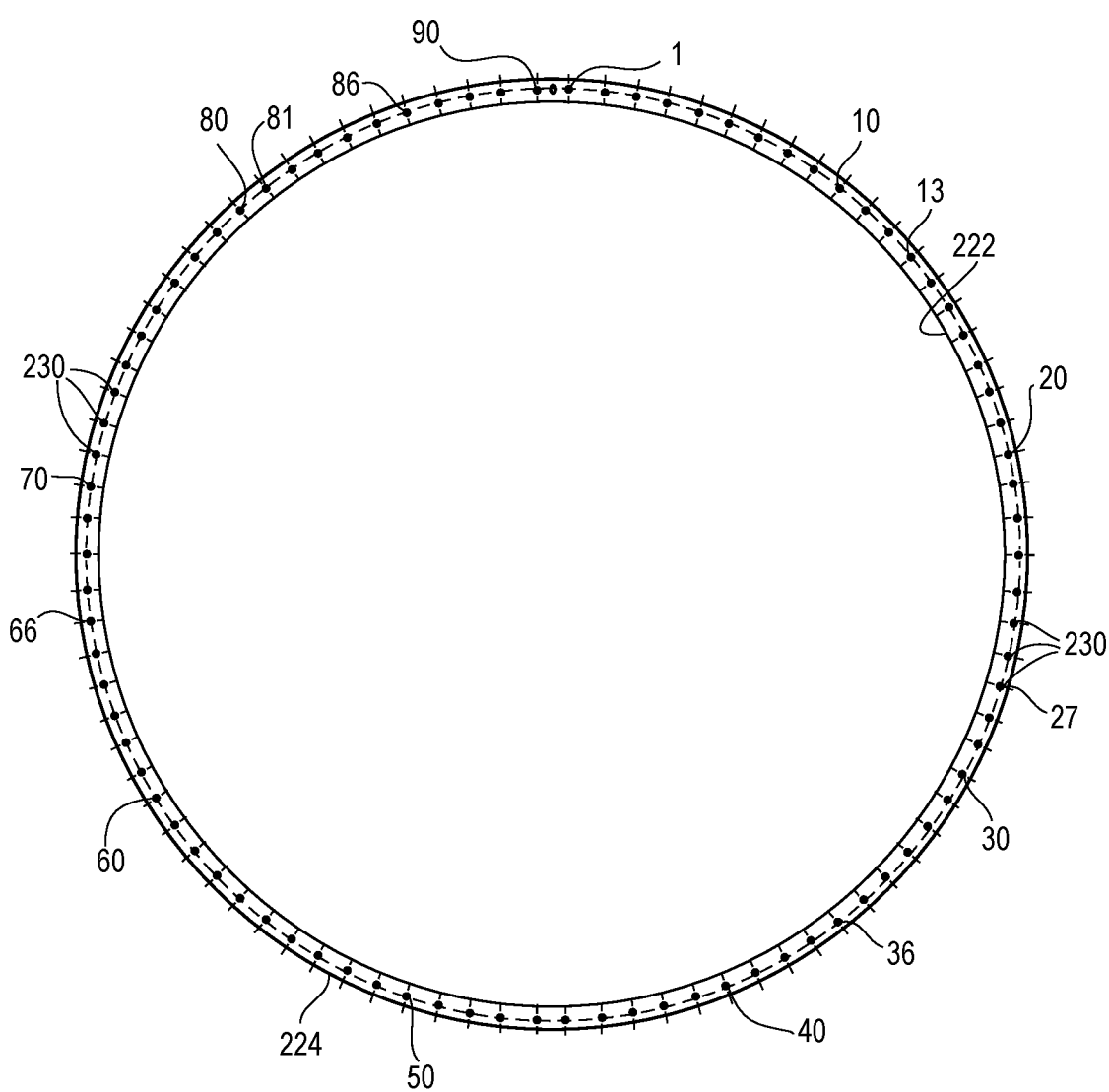
FIG. 2 is end elevational view of the aft end of the fan casing of FIG. 1.
Figure 3:
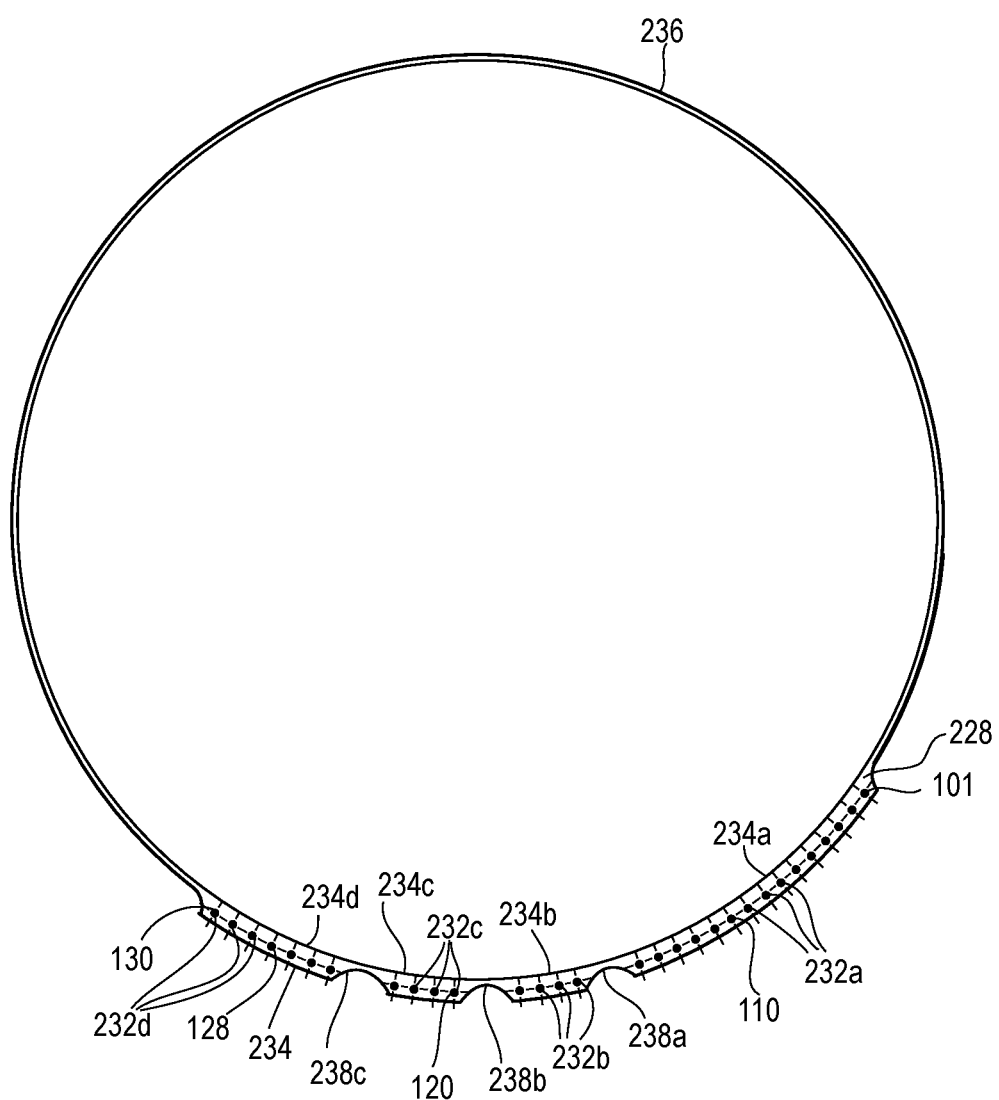
FIG. 3 is a sectional view of the fan casing taken generally along the lines 3-3 of FIG. 1.
Figure 4:
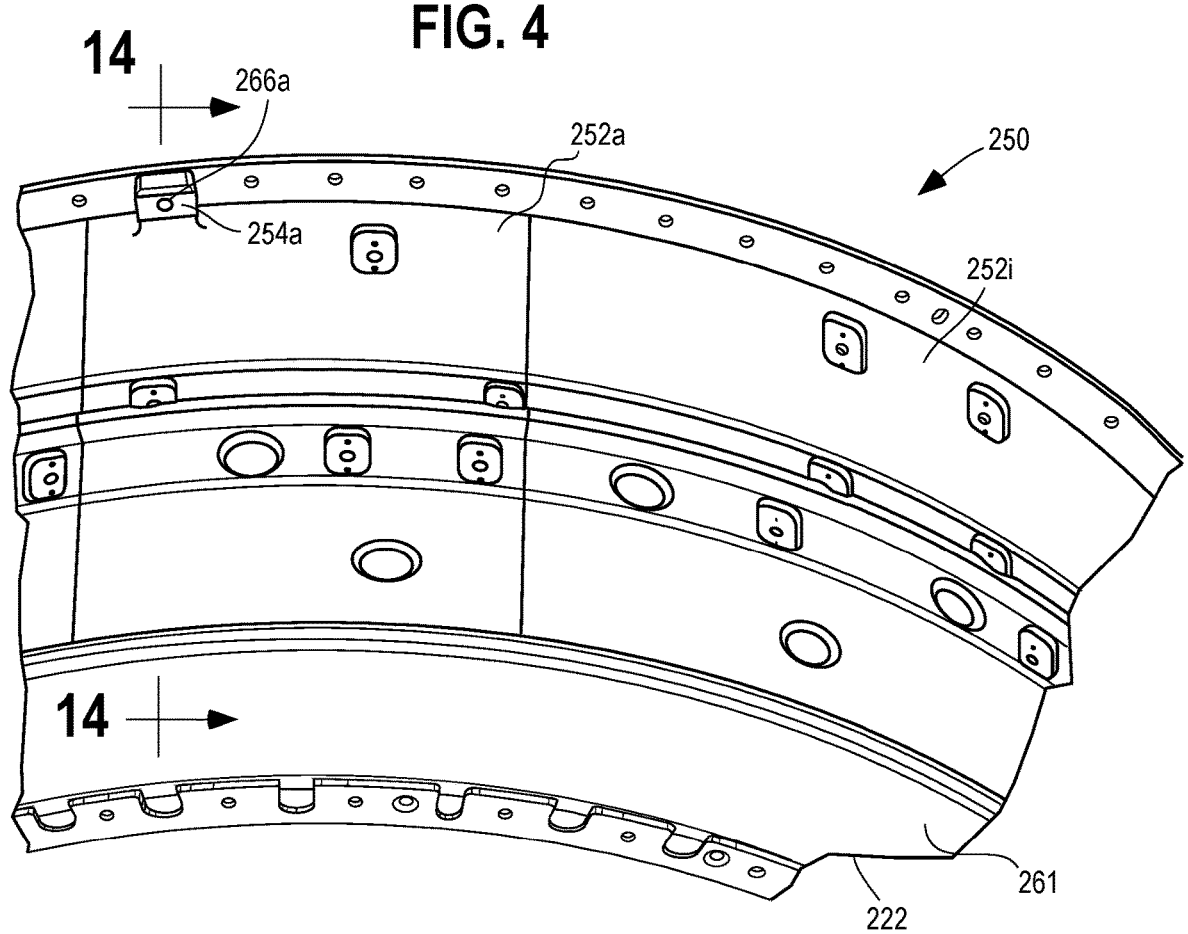
FIGS. 4-12 are isometric views of locating structures that may be used to locate portions of the fan casing of FIG. 1.
Figure 5:
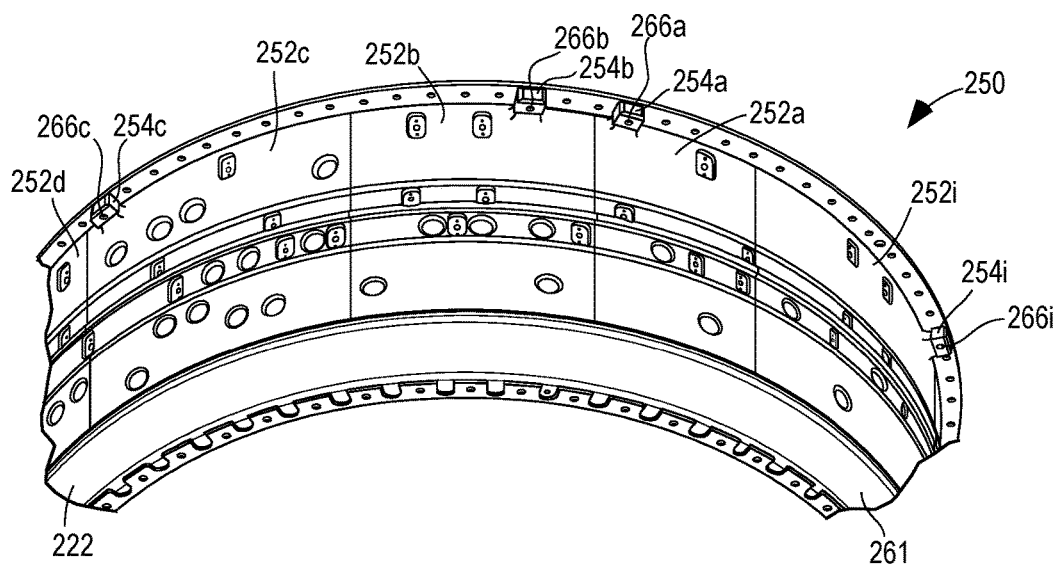
Figure 6:
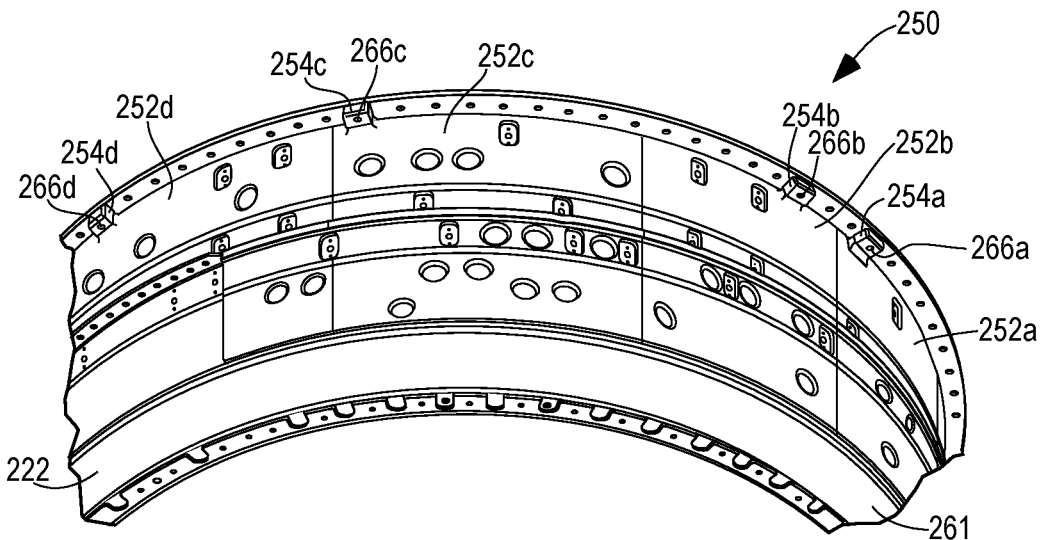
Figure 7:
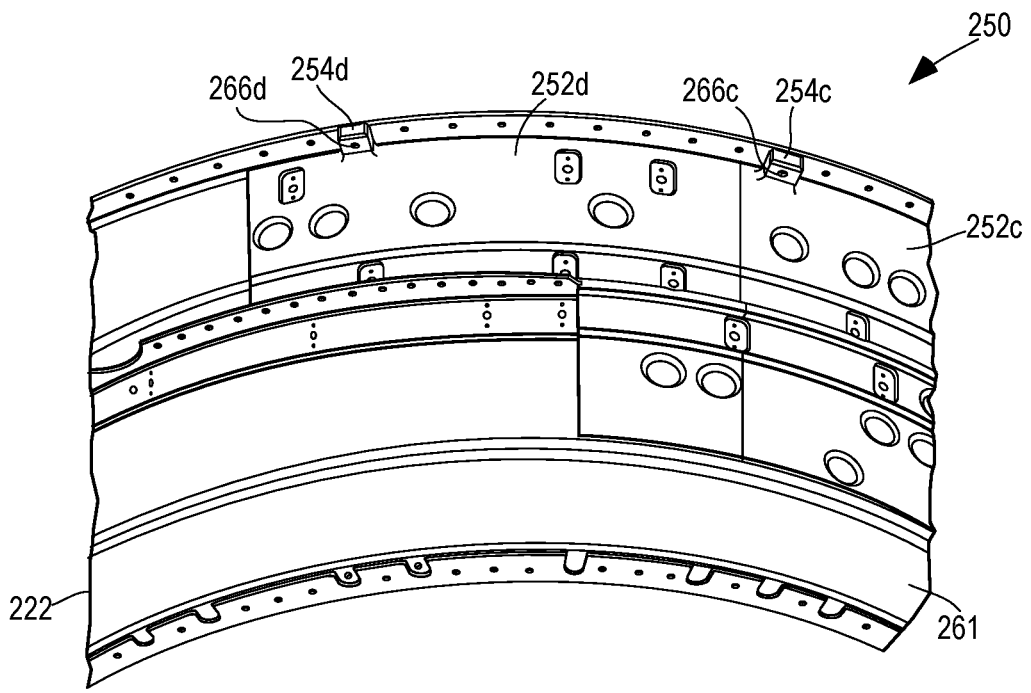
Figure 8:
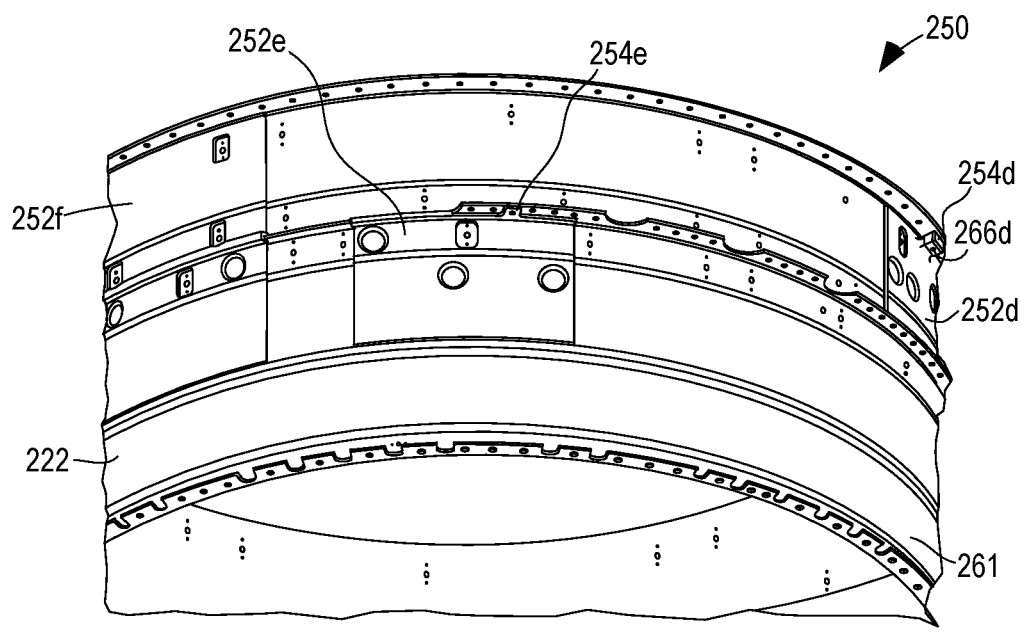
Figure 9:
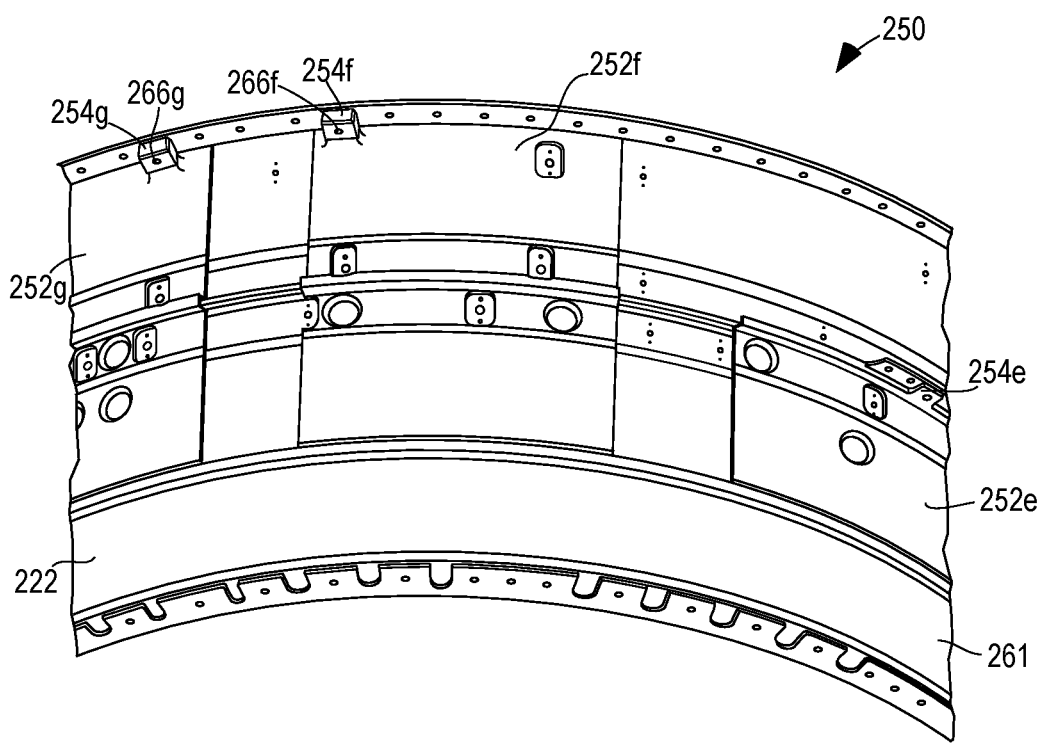
Figure 10:
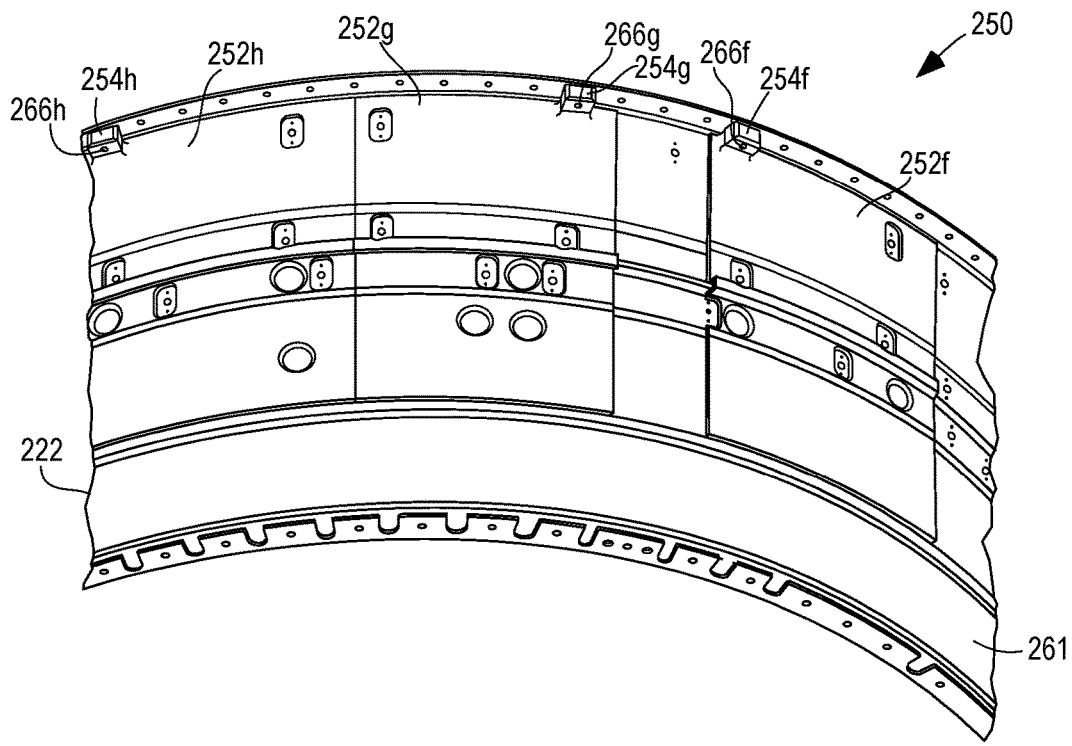
Figure 11:
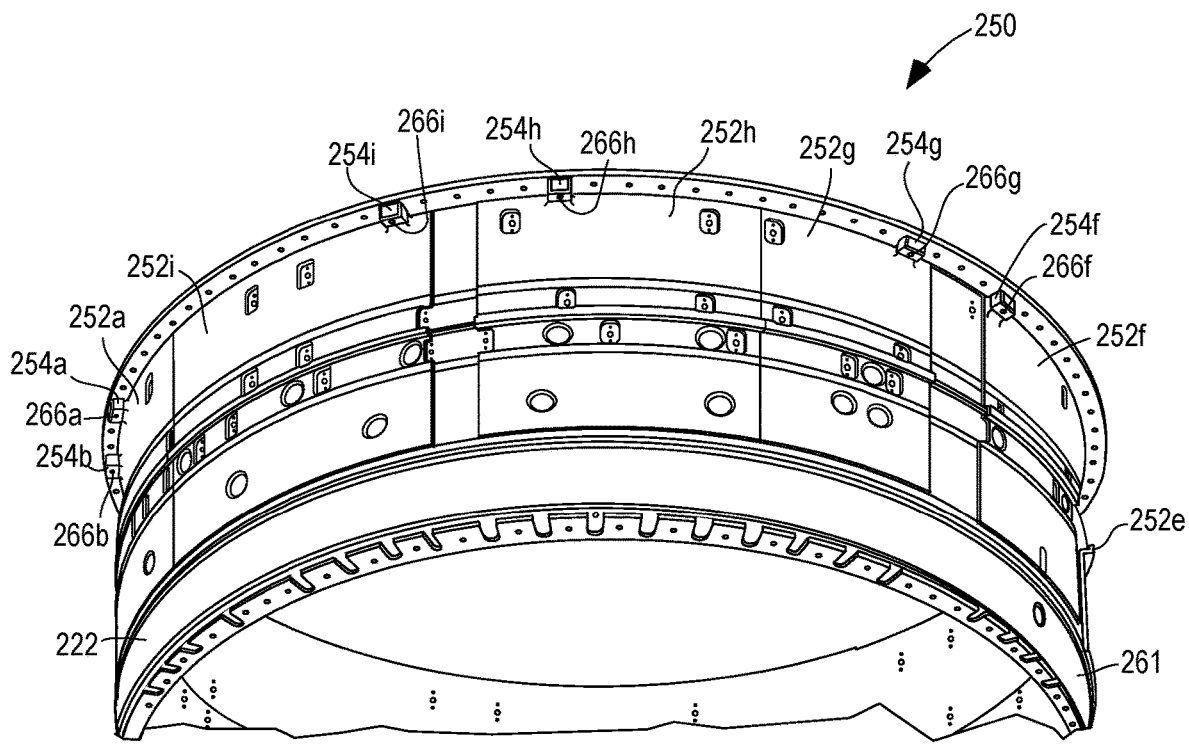
Figure 12:
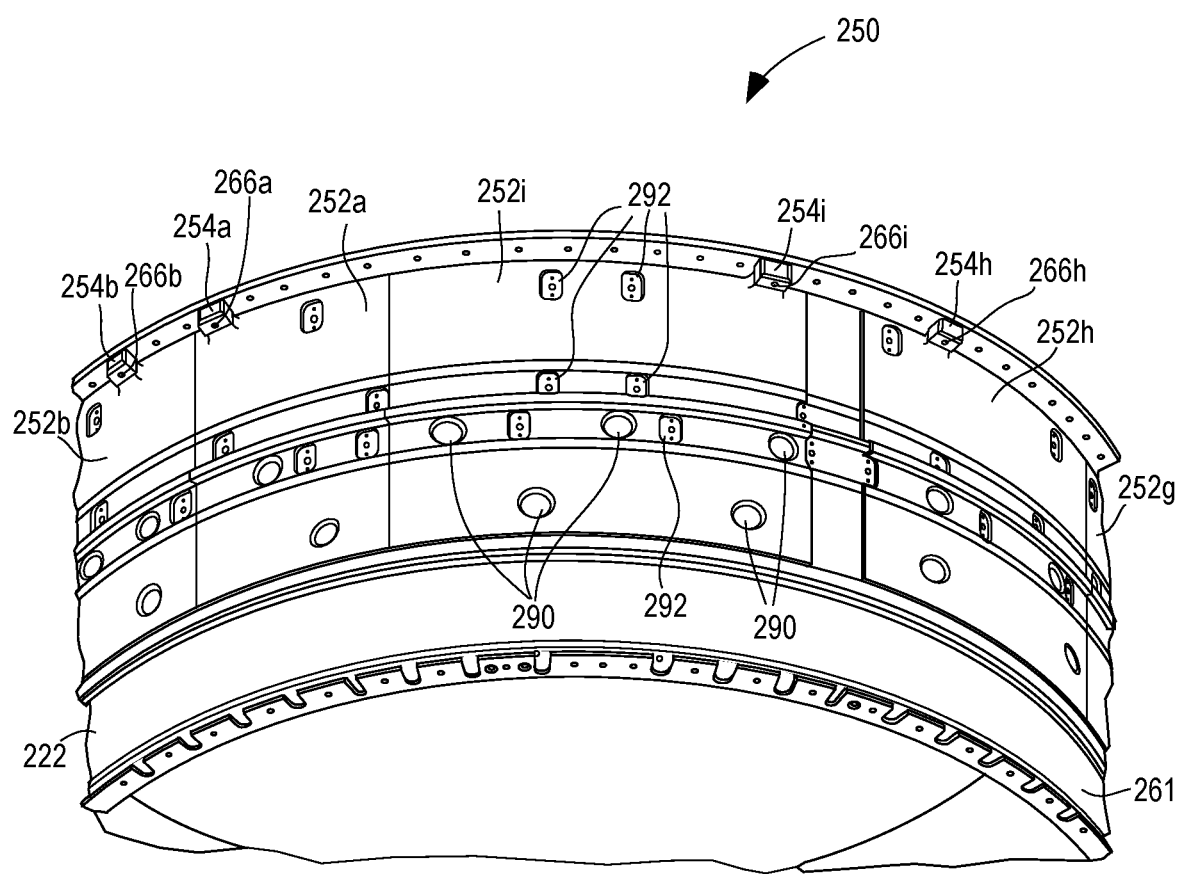

Referring also to FIGS. 2 and 3, a first plurality of apertures 230 extends through the first flange 224 and a second plurality of apertures 232 extends through the second flange 228. In the illustrated embodiment, ninety apertures 230 are disposed in the flange 224 and the apertures 230 are equally spaced from one another, although a different number of apertures may instead extend through the flange 224 and/or the apertures 230 may be unequally spaced from one another. In the illustrated embodiment, the apertures 230 are numbered 1 through 90 in FIG. 2 and other FIGS. (while not all of the numbers are shown in the FIGS., it should be understood that the numbering is consecutive). Further, the apertures 230 are circular and have equal diameters and all are disposed at equal radial distances between inner and outer edges of the flange 224, although the apertures 230 may be disposed at unequal radial distances and/or may be of different cross sectional sizes and/or shapes.

As seen specifically in FIG. 3, the second flange 228 has a varying radial size with circumferential extent and extends continuously and fully about the fan casing. As shown, the second flange is scalloped (i.e. the flange includes cut-outs) and the scalloping is particularly biased around the bottom dead center of the fan casing. In an alternative embodiment, the second flange may be scalloped in a more equally distributed manner. In FIG. 3, the flange 228 includes a first portion 234 of a relatively large radial extent and a second portion 236 of a relatively small radial extent. The relatively large radial extent of the first portion may have a constant or variable radial size, as may the relatively small radial extent of the second portion 236. The first portion 234 is subdivided by any suitable means, such as three cut-outs 238a-238c into four subsections 234a-234d. Each subsection 234a-234d has multiple apertures of the second plurality of apertures 232 extending therethrough. Specifically, the subsection 234a includes apertures 232a (numbered 101-115 in FIG. 3), whereas the subsection 234b includes apertures 232b (numbered 116-119), the subsection 234c includes apertures 232c (numbered 120-123), and the subsection 234d includes apertures 232d (numbered 124-130) (again, while not all of the numbers are shown in the FIGS., it should be understood that the numbering is consecutive). In the illustrated embodiment, the apertures 232a-232d of each subsection 234a-234d are equally spaced from one another, and the apertures 232 are circular, have equal diameters, and are disposed at equal radial distances between inner and outer edges of the flange 228. As is the case with the apertures 230, the apertures 232 of each subsection 234a-234d may be spaced at unequal distances from one another, a different number of apertures 232 may be provided in any or all of the subsections 234a-234d, the apertures 232 may have differing cross sectional sizes and/or shapes, and/or the apertures 232 may be disposed at different radial distances, etc. Also, a different number of cut-outs 238 may be provided subdividing the first portion 234 into a different number of subsections, the second portion may be subdivided in any manner, such as by cut-outs, into subsections, etc.

Referring to FIGS. 4-12, an assembly fixture 250 comprises a plurality of locating structures 252 that can be positioned about the wall 222 and maintained in place so that locating features 254 associated with the locating structures 252 can be used to identify mounting locations for devices to be secured to the wall 222. While nine locating structures 252a-252i are illustrated as comprising the assembly fixture 250, it should be understood that a greater or lesser number of locating structures may instead be provided.

Each of the locating structures 252a-252i preferably is curved and, in the illustrated embodiment, has an inner surface 260 (260a being shown in FIG. 14) with a constant radius of curvature that completely or substantially matches an outer radius of curvature of an outer surface 261 (as shown in FIGS. 4-12, and 14) of the wall 222. Each locating structure further preferably includes at least one of the positioning features 254a-254i, respectively, engageable by a fastener 263. In the illustrated embodiment, each positioning feature 254a-254i comprises an enlarged portion having a bore 266 extending therethrough (the bore 266 of the positioning feature 254a is visible in FIG. 14). Further in the illustrated embodiment, the bores 266 are smooth (i.e., unthreaded) as are the apertures 230, 232, although one or more of the elements 230, 232, 266 (particularly the bores 266) may be threaded.

Figure 14:
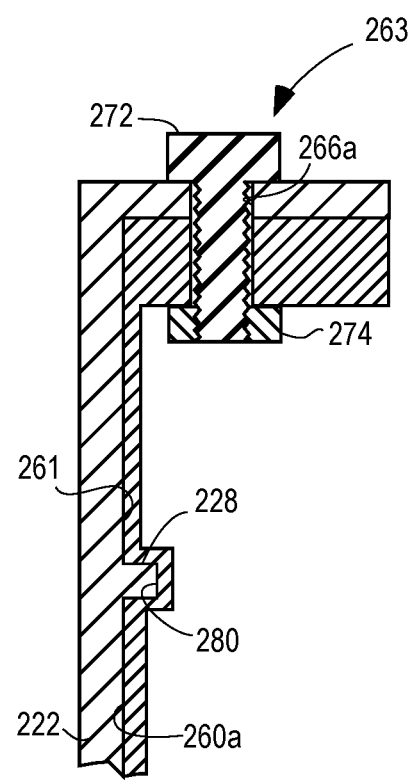
FIG. 14 comprises a sectional view of a locating structure taken generally along the lines 14-14 of FIG. 4.

In preparation for a locating process, the locating structures 252a-252d and 252f-252i are mounted by bolts preferably identical to the bolt 272 of FIG. 14 that extend through particular apertures 230, specifically aperture numbers 10, 13, 27, 36, 66, 70, 81, and 86(FIG. 2), and associated bores 266 of the locating structures 252a-252d and 252f-252i, respectively. Nuts preferably identical to the nut 274 of FIG. 14 are fastened onto the bolts and tightened to secure the locating structures 252a-252d and 252f-252i to the fan casing wall 222. As illustrated in FIG. 14, bolt 272 and nut 274 are threaded. In an alternative embodiment, the fastener may comprise of one or more components of a non-threaded design, such as a clevis or deco fastener.

The structures 252a-252d and 252f-252i are thus mounted to the first flange 224 and extend beyond the second flange 228. The inner surfaces 260 of the locating structures 252a-252d and 252f-252i preferably (although not necessarily) closely conform to the outer surface 261 of the wall 222. Each of the structures 252a-252d and 252f-252i preferably includes a receiving slot 280 (one of which is shown in FIG. 14) that closely receives the second flange 228.

Figure 13:
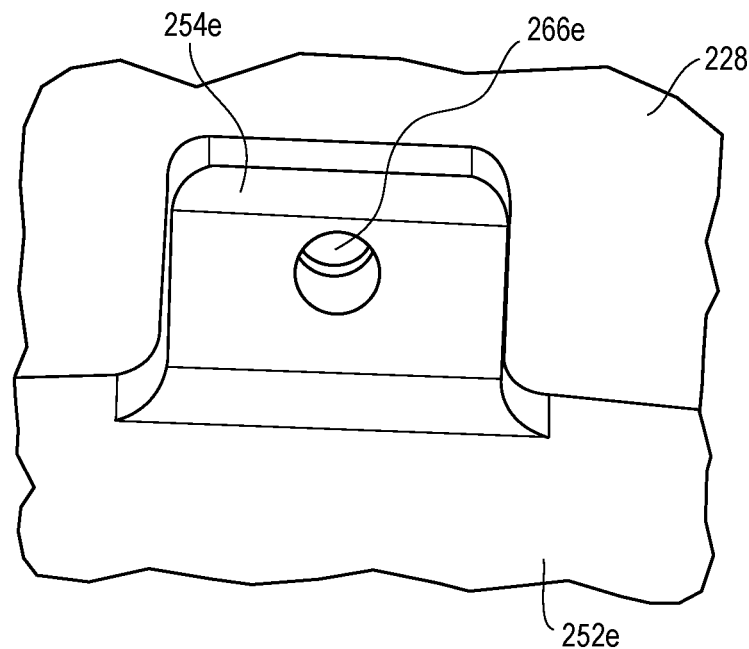
FIG. 13 is a fragmentary isometric view of a portion of one of the locating structures of FIGS. 4-12, for example, the locating structure 254e.

The locating structure 252e is mounted by a threaded bolt identical to the bolt 272 seen in FIG. 14 that extends through one of the apertures 232, specifically the aperture number 128, and through an associated bore 266 of the locating structure 252e (FIG. 13 illustrates the enlarged portion and the bore 266). A nut identical to the nut 274 is threaded onto the bolt and tightened to secure the locating structure 252e to the fan casing wall 222. In this case, the structure 252e is mounted to the second flange 228 such that the structure 252e is disposed entirely on one side of the flange 228.

If desired the threaded bolts may instead be threaded into threaded bores in the enlarged portions of the locating structures 252, in which case the nuts may be omitted. In an alternative embodiment, the fastener may comprise of one or more components of a non-threaded design, such as a clevis or cleco fastener mentioned above.

As should be evident from an inspection of FIGS. 4-12, the locating structures 252 may circumferentially abut one another and/or may be spaced from one another and/or a portion of one or more of the locating structure(s) need not extend beyond the flange 228 (FIG. 7) depending upon the positions that are to be indicated.

Each of the locating structures 252 includes at least one opening extending therethrough to permit access to the wall 222. In the illustrated embodiment, circular openings 290 and rectangular openings 292 (examples of which are noted in FIG. 12) are formed, although a greater or lesser number of the same or differently-shaped openings may be provided. The openings 290 and 292 comprise locating features indicating a particular location of the fan casing wall 222 when the respective locating structure 252 is mounted to the fan casing 220 in the fashion described above. Each of the circular openings 290 locates a maximum positional tolerance for a component or other structure such as the above mentioned Click Bond to be secured to the fan casing 220. Each of the rectangular openings 292 indicates a feature of the wall 222 that, for example, would interfere with placement of the locating structure 252 on the proper portion of the wall 222. The rectangular openings 292 may alternatively or in addition locate other structures to be secured to the wall 222.

An assembler may thus secure the locating structures 252 to the wall 222, use an appropriate marking device (e.g., a nonchlorinated marker) to indicate the outlines of the circular openings 290 (and the rectangular openings 292, if appropriate), remove the locating structures 252, and secure the appropriate structures or devices within the indicated outlines in any suitable fashion, such as by adhesive bonding.

INDUSTRIAL APPLICABILITY

When used, the locating structures 252 themselves locate using geometric features of the fan wall 222:
1. Axial: The fixtures have interference fits with the flanges 224 or 228;
2. Circumferential: Holes on the flanges 224 or 228 and bolts and nuts secure the locating structures against circumferential movement; and
3. Radial: The locating structures rest against the fan wall profile.

One or more of the locating structures 252 may be fabricated using a computer modeling technique utilizing, for example, a fused deposition modeling technique that operates a 3D printer. In such a case the locating structures 252 may be made of any suitable material, such as polylactic acid (PLA) polymer or another suitable plastic. The transparency of PLA may make such material of particular use in the embodiments described herein, although the present embodiments are not limited to use of such material. Thus, the locating structures 252 may be made of one or more other suitable materials, including metal, composite materials, fiberglass, etc.

The locating structure manufacturing process described herein allows for quick and inexpensive fabrication, limited by the layer resolution of the 3D printer. With current manufacturing technology, tolerances can be improved by 25-50% of current value. Electronic files defining the locating structures 252 can be readily transmitted anywhere for production or repair saving the time and cost of shipping tooling to another facility. Furthermore, the lead times for development of different versions of placement systems for instrumentation is significantly reduced, allowing for more flexibility in the development process with minimal waste of time and material.

The embodiments described herein are not limited to assembly of fan casings, but are more generally highly scalable for the assembly of virtually any shape component requiring a complex placement scheme such as rear fan casings, bypass ducts, as well as mount rings. It should be noted that the wall of the fan casing may include a non-circular cylindrical portion at one end with one or more non-cylindrical portion(s) depending upon the engine type, and engine component that is enclosed thereby. Additionally, it should be noted that the assembly fixture can be manufactured to conform to non-circular shapes. Additive manufacturing allows practically unlimited geometric capability and method of sharing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. An assembly fixture for a fan casing of a gas turbine engine wherein the fan casing comprises a first flange disposed at an axial end of the fan casing and comprising a plurality of apertures extending therethrough; and
a second flange spaced from the first flange;
wherein the assembly fixture comprises: a locating structure engageable by a fastener extending through a particular aperture of the plurality of apertures to secure an inner surface of the locating structure to an outer surface of the fan casing, the locating structure comprising a positioning feature, a receiving slot that receives the second flange when the locating structure is mounted to the fan casing, and a locating feature indicating a particular location of the fan casing when the locating structure is mounted to the fan casing; and
wherein the locating structure is made of plastic.

2. The assembly fixture of claim 1, wherein the fan casing comprises a portion that is circular cylindrical in shape; wherein the outer surface of the fan casing comprises a particular radius of curvature; and wherein the inner surface of the locating structure comprises the particular radius of curvature.

3. The assembly fixture of claim 1, wherein the locating structure, the positioning feature, the fastener, and the locating feature comprise a first locating structure, a first positioning feature, a first fastener, and a first locating feature, respectively, and wherein the assembly fixture further comprises a second locating structure comprising a second positioning feature engageable by a second fastener to secure the inner surface of the second locating structure to the outer surface of the fan casing at a position spaced from the first locating structure and a second locating feature indicating a further particular location of the fan casing when the second locating structure is mounted to the fan casing.

4. The assembly fixture of claim 3, wherein the second fastener extends through a further particular aperture of the plurality of apertures when the second locating structure is mounted to the fan casing.

5. The assembly fixture of claim 3, wherein the flange comprises a first flange at an axial end of the fan casing and the fan casing further comprises a second flange spaced from the first flange comprising a further plurality of apertures extending therethrough and the second fastener extends through a further particular aperture of the further plurality of apertures when the second locating structure is mounted to the fan casing.

6. The assembly fixture of claim 1, wherein the locating structure comprises a plurality of locating features that indicate a plurality of locations of the fan casing when the locating structure is mounted to the fan casing.

7. An assembly fixture for a fan casing of a gas turbine engine wherein the fan casing comprises a first flange comprising a plurality of apertures extending therethrough and a second flange spaced from the first flange, the assembly fixture comprising:
  a plurality of locating structures each comprising a positioning feature that is engageable by a fastener extending through a particular aperture of the plurality of apertures to secure an inner surface of the locating structure to an outer surface of the fan casing, a receiving slot that receives the second flange when the locating structure is mounted to the fan casing, and a locating feature indicating a particular location of the fan casing when the locating structure is mounted to the fan casing; and
  a further locating structure engageable by a further fastener to the second flange and comprising a receiving slot that receives the second flange when the further locating structure is mounted to the fan casing and a further locating feature indicating a further particular location of the fan casing when the further locating structure is mounted to the fan casing;
  wherein the plurality of locating structures and the further locating structure are made of plastic.

8. The assembly fixture of claim 7, wherein the locating feature comprises at least one opening.

9. The assembly fixture of claim 7, wherein the plurality of locating structures and the further locating structure are made of plastic using a 3D printer.

10. The assembly fixture of claim 7, wherein the plurality of locating structures comprises eight locating structures and the further locating structure comprises a single locating structure.

11. The assembly fixture of claim 7, wherein each fastener comprises a bolt and a nut.

12. The assembly fixture of claim 7, wherein each positioning feature comprises an enlarged portion.

13. An assembly fixture for a fan casing of a gas turbine engine wherein the fan casing comprises a first flange disposed at an end of the fan casing and comprising a first plurality of apertures extending therethrough and a second flange disposed at a medial portion of the fan casing spaced from the first flange and comprising a second plurality of apertures, comprising:
  a plurality of locating structures, each comprising a positioning feature comprising an enlarged portion engageable by a fastener extending through a particular aperture of the first plurality of apertures to secure an inner surface of the locating structure to an outer surface of the fan casing, a receiving slot that receives the second flange when the locating structure is mounted to the fan casing, and a plurality of openings each indicating a particular location of the fan casing when the locating structure is mounted to the fan casing; and
  a further locating structure comprising a further positioning feature comprising a further enlarged portion engageable by a further fastener extending through a certain aperture of the second plurality of apertures to secure an inner surface of the further locating structure to the outer surface of the fan casing, the further locating structure comprising a receiving slot that receives the second flange when the further locating structure is mounted to the fan casing and a further plurality of openings each indicating a further particular location of the fan casing when the further locating structure is mounted to the fan casing;
  wherein the plurality of locating structures and the further locating structure are made of plastic.

14. The assembly fixture of claim 13, wherein the plurality of locating structures and the further locating structure are made of plastic using a 3D printer.

15. The assembly fixture of claim 14, wherein the plurality of locating structures comprises eight locating structures and the further locating structure comprises a single locating structure.

16. The assembly fixture of claim 15, wherein each fastener comprises a bolt and a nut.

17. The assembly fixture of claim 16, wherein each locating structure engages the second flange.

\* \* \* \* \*